Feb. 20, 1934.  J. A. HOEGGER  1,948,111
SIDE LIGHT ATTACHMENT FOR MIRRORS
Filed Oct. 1, 1930   2 Sheets-Sheet 1
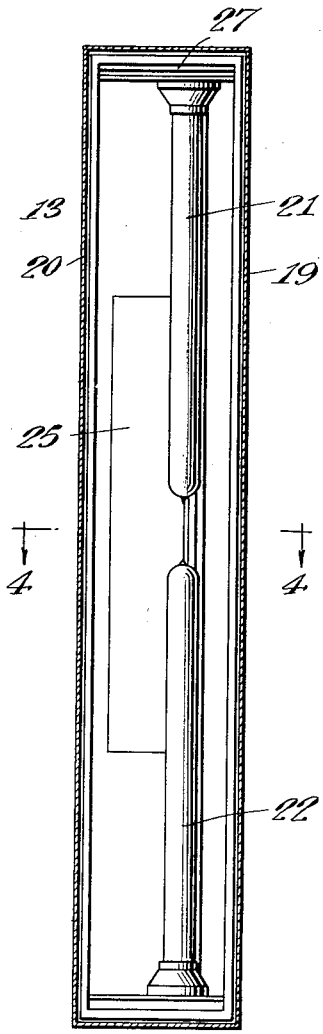
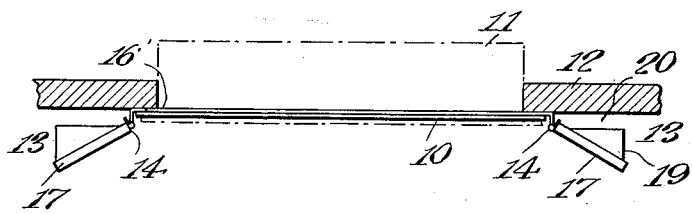
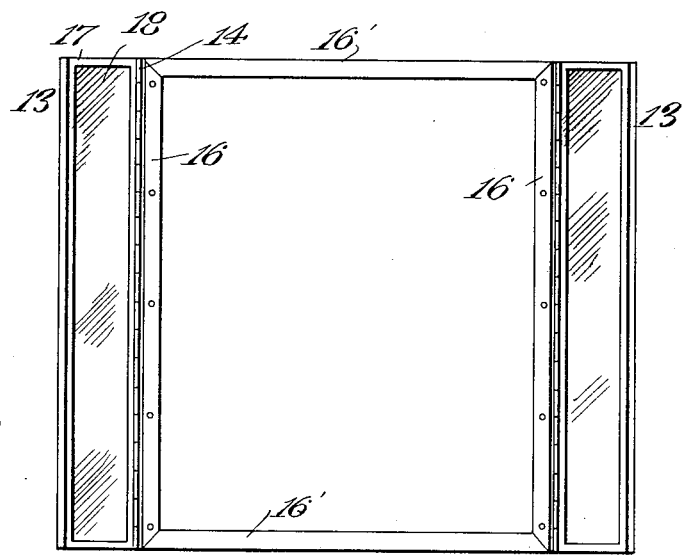

Feb. 20, 1934. J. A. HOEGGER 1,948,111
SIDE LIGHT ATTACHMENT FOR MIRRORS
Filed Oct. 1, 1930 2 Sheets-Sheet 2

Joseph A. Hoegger, Inventor.
By his Attorneys,
Hoguet & Neary.

Patented Feb. 20, 1934

1,948,111

UNITED STATES PATENT OFFICE 1,948,111

SIDE LIGHT ATTACHMENT FOR MIRRORS

Joseph A. Hoegger, Jersey City, N. J.

Application October 1, 1930. Serial No. 485,583

4 Claims. (Cl. 240—4.1)

My invention relates to improvements in side light attachments for mirrors.

One object of my invention is to produce an adjustable side light attachment for either wall mirrors or for mirrors which are attached to or form part of the door of a wall cabinet so that the lighting attachment on one or both sides of the mirror may be adjusted so as to throw the light at a desired angle upon the mirror or upon the person, thereby giving a better reflecting effect.

The invention is also intended to produce a side light attachment which is adjustable as stated, but which can be detachable and has convenient means for fastening them in place at the side of a mirror already in position or in association with a cabinet which has been already fixed in the wall. When permanently attached to a part of the mirror, whether the latter be a mirror or simply a part of the cabinet door, the side light attachment can be readily adjusted so as to get the best lighting effect, and if the structure is applied to a cabinet, either permanently or detachably, it is constructed and arranged so that the lighting means is spaced from the cabinet and the heat from the lamp or lamps furnishing part of the lighting attachment has no injurious or disagreeable effect on the contents of the cabinet. This is important because heretofore lights have sometimes been arranged in cabinets so as to project through a transparent or translucent part of the door or mirror, and while such an arrangement furnishes interior lighting means, it is objectionable because the angle of light cannot be adjusted. A most serious objection is that the generated heat from the lamps affects the contents of the cabinet.

My invention is further intended to combine if desired an adjustable side light attachment which also embodies a mirror so that with an attachment on each side of the main mirror, the desired lighting effect is had and also the triple mirror effect, such as is obtained by the use of so-called "wing mirrors."

My invention is also intended to provide a simple and secure, as well as convenient, means for attaching and supporting the lighting elements at the sides of a mirror whether the latter simply be a wall mirror or part of the cabinet or other door.

Reference is to be had to the accompanying drawings forming a part of this specification, in which similar reference characters indicate corresponding parts in all the views.

Figure 1 is a vertical sectional elevation of one of the lighting elements, the view being taken on the line 1—1 of Figure 4.

Figure 2 is a sectional plan view illustrating the attachment of two side light elements to a mirror cabinet door.

Figure 3 is a detail front view of the lighting elements and supporting frame.

Figure 4:
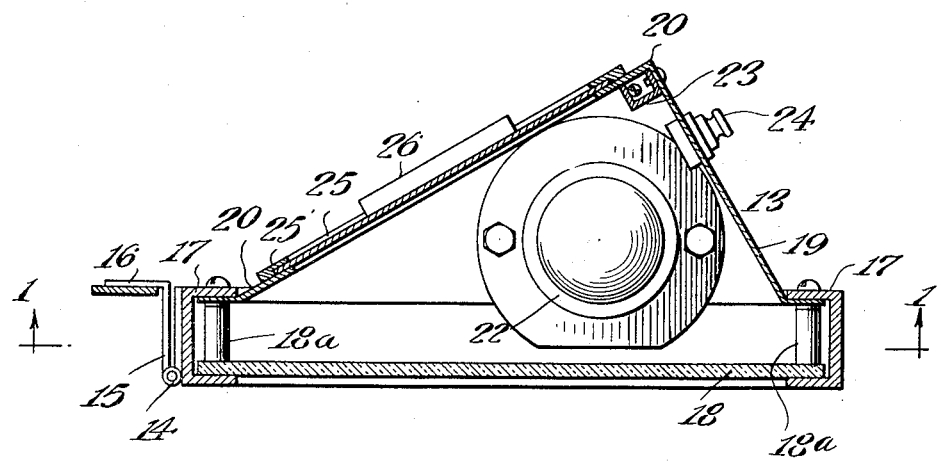
Figure 4 is an enlarged cross section on the line 4—4 of Figure 1.

In the drawings the mirror 10 may be any suitable mirror which is attached flatwise to a wall, and in Figure 2 it is shown diagrammatically as forming part of a door for the wall cabinet 11 which is supported conventionally in the wall 12. The side lighting attachment comprises the lighting elements 13 which are hinged as at 14 at the sides of the mirror 10 so that they can be individually swung in or out and the light from them thrown upon the person or one looking in the mirror 10.

These elements 13 carry lighting means, as presently described, and by reference to Figure 2, it will be seen that the elements which are in the form of casings, as indicated, support the lighting means spaced apart from the cabinet 11 so that the heat from the contained lamps cannot injuriously affect any contents of the cabinet.

The particular structure of the lighting elements 13 is not very important but it will be described for clearness and the form shown is a preferred form. Each element 13 is hinged as at 14 to the flange 15 of a flat plate 16 which is adapted to slide behind the mirror 10 and be fastened in place, but preferably the side plates 16 are united at top and bottom by cross plates 16', as in Figure 3, thus making a flat rectangular frame carrying the elements 13 at the sides and adapted to slip behind a mirror 10 either on the cabinet door or on a wall mirror. If the attachment is to be applied to a mirror or door before the latter is seated, it will, of course, be made to fit or otherwise the part 16 or 16' can be made of a size to fit a mirror or door which is already hung. The hinge 14 should be substantial and preferably extends the whole length of each lighting element 13. One butt of the hinge is attached to the channel frame of the element 13 and the other butt is formed by the flange 15 already referred to, but the form of hinge can be varied if desired.

As illustrated, the frame 17 carries a frosted glass 18 which may be swung so that the light thrown through it will strike the person or thing to be reflected or mirror 10, and the glass 18 which can be suitably frosted is held in place by spring clips 18ª which are conventional and shown in a general way. The back of the casing comprising the element 13 is preferably formed of metal sheets 19 and 20, and these two sides can be a single piece if desired, meeting at the back apex 20' so that the structure as a whole is triangular, and thus it can be made light, strong and simple. The form and design of the casing element, however, can be changed to suit the taste without affecting the invention.

Within the casing above described, the lamps 21 and 22 are arranged and these are preferably, though not necessarily, conventional tubular lamps, this type of lamp giving more uniform light than lamps of other kinds. They are supported at the top and bottom of the casing as illustrated, and the lamp wires which may be of the usual kind can be concealed and held out of the way in a channel 23 at the back of the casing. I have also shown a conventional switch 24 on the casing back, but the lamp details are only conventionally illustrated and form no part of the invention.

On part of the casing back and preferably the side 20, I have arranged a sliding door 25 which moves in ways 25' and can have a handle 26. The door is to afford access to the interior of the lighting element and especially to the lamps. I also preferably arrange ventilating slots 27 at the upper part of the casing so that the heat generated from the lamps may escape. The casing of each element 13 is preferably closed at top and bottom and, as above stated, may be made in various designs.

Figure 5:
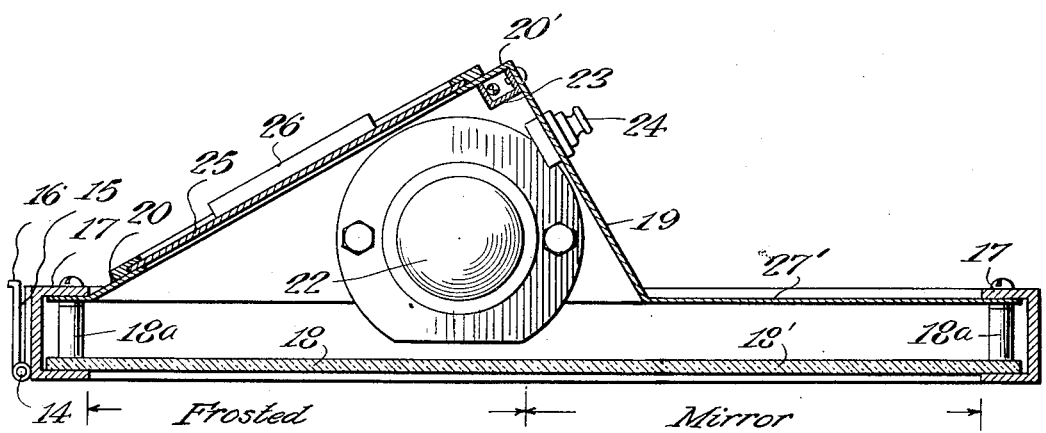
Figure 5 is a cross section of a modified form of one of the lighting elements showing how the wing mirror can be combined with it.

In Figure 5, I have shown a modified form of the casing in which the structure, while it does not depart from the idea above disclosed, gives an additional function to the structure of the lighting element 13 already described. The casing can be prolonged or widened along its free edge as shown in the drawings and as illustrated at 27', and this widened portion may be provided with a mirror 18' as shown. The glass of the mirror may be continuous with the glass 18 or it may be a separate plate of glass or other material having a mirror surface. When this form of structure is used, it will be seen that the attachment to a mirror or door can be made as already described, the elements can be adjusted to give the desired lighting effect and the mirrors 18' act as wing mirrors giving the triple mirror effect so that a person can get an all around view of his body, and thus the structure, as a whole, is very convenient both for lighting and for ample and comprehensive reflection.

I claim:

1. A device of the kind described comprising, a mirror, a light diffusing surface, means for hingedly mounting said light diffusing surface at one edge of said mirror, the hinged edge of said light diffusing surface arranged in close proximity to said mirror and extending along at least a major portion of the proximate edge thereof, said light diffusing surface being at least partially pervious to light, and lighting means arranged at the rear of said light diffusing surface.

2. A device of the kind described comprising, a mirror, a pair of light diffusing surfaces, means for hingedly mounting said light diffusing surfaces in opposed relationship at opposite edges of said mirror, the hinged edge of each light diffusing surface arranged in close proximity to said mirror and extending along at least a major portion of the proximate edge thereof, each light diffusing surface being at least partially pervious to light, and lighting means arranged at the rear of each light diffusing surface.

3. A device of the kind described comprising, a mirror, a pair of casings, means for hingedly mounting said casings in opposed relationship at opposite edges of said mirror, each casing having an exposed light diffusing surface extending outwardly from its hinged edge, each light diffusing surface arranged in close proximity to said mirror and extending along at least a major portion of the proximate edge thereof, each light diffusing surface being at least partially pervious to light, and lighting means arranged in the rear of each light diffusing surface.

4. A device of the kind described comprising, a mirror, a pair of casings, means for hingedly mounting said casings in opposed relationship at opposite edges of said mirror, each casing having an exposed light diffusing surface extending outwardly from its hinged edge and an exposed mirrored surface extending inwardly from an opposite edge toward said light diffusing surface, each light diffusing surface arranged in close proximity to said mirror and extending along at least a major portion of the proximate edge thereof, each light diffusing surface being at least partially pervious to light, and lighting means arranged in the rear of each light diffusing surface.

JOSEPH A. HOEGGER.